(12) United States Patent
Ryu

(10) Patent No.: US 8,087,056 B2
(45) Date of Patent: Dec. 27, 2011

(54) OPERATING METHOD OF CONTENTS ON DEMAND SYSTEM

(75) Inventor: Joo Hyeon Ryu, Seoul (KR)

(73) Assignee: Alticast Corporation, Seoul (KR)

( * ) Notice: Subject to any disclaimer, the term of this patent is extended or adjusted under 35 U.S.C. 154(b) by 190 days.

(21) Appl. No.: 12/513,397

(22) PCT Filed: Nov. 20, 2007

(86) PCT No.: PCT/KR2007/005832
§ 371 (c)(1),
(2), (4) Date: May 27, 2009

(87) PCT Pub. No.: WO2008/062989
PCT Pub. Date: May 29, 2008

(65) Prior Publication Data
US 2010/0031300 A1 Feb. 4, 2010

(30) Foreign Application Priority Data
Nov. 20, 2006 (KR) .................. 10-2006-0114233

(51) Int. Cl.
*H04N 7/173* (2011.01)
(52) U.S. Cl. ............. 725/93; 725/87; 725/95; 725/115; 725/120
(58) Field of Classification Search .................. None
See application file for complete search history.

(56) References Cited

U.S. PATENT DOCUMENTS

| | | | |
|---|---|---|---|
| 6,738,983 B1 * | 5/2004 | Rao et al. ................ | 725/120 |
| 7,626,950 B2 * | 12/2009 | Wright et al. .............. | 370/260 |
| 2002/0059610 A1 * | 5/2002 | Ellis ....................... | 725/58 |
| 2004/0068745 A1 * | 4/2004 | Yamamoto et al. ........ | 725/87 |
| 2004/0103437 A1 * | 5/2004 | Allegrezza et al. ........ | 725/95 |
| 2004/0143850 A1 * | 7/2004 | Costa ..................... | 725/115 |
| 2006/0235974 A1 | 10/2006 | Ueda | |

FOREIGN PATENT DOCUMENTS

| | | |
|---|---|---|
| KR | 1020020023596 A | 3/2002 |
| KR | 1020050103558 A | 11/2005 |
| KR | 1020060064469 A | 6/2006 |

OTHER PUBLICATIONS

International Search Report dated Mar. 6, 2008 to corresponding Korean patent application No. PCT/KR2007/005832.

* cited by examiner

*Primary Examiner* — Kristine Kincaid
*Assistant Examiner* — Oschta Montoya
(74) *Attorney, Agent, or Firm* — Maier & Maier, PLLC

(57) ABSTRACT

A method of effectively operating a Content-On-Demand (COD) system is disclosed. Requests for content are received from COD clients. If the requested content exists in a COD server and the content is content for one-to-one transmission, a session is set up between the COD server and one of the COD clients by providing access information for one-to-one transmission. Thereafter, the requested content is transmitted to the corresponding COD client in a one-to-one transmission manner, and then the session is terminated when the transmission is completed. If the requested content is content for one-to-N transmission, sessions are set up between the COD server and the respective COD clients by providing access information for one-to-N transmission. Thereafter, the requested content is transmitted to the corresponding COD clients in a one-to-N transmission manner when a one-to-N transmission requirement is met, and then the sessions are terminated when the transmission is completed.

8 Claims, 2 Drawing Sheets

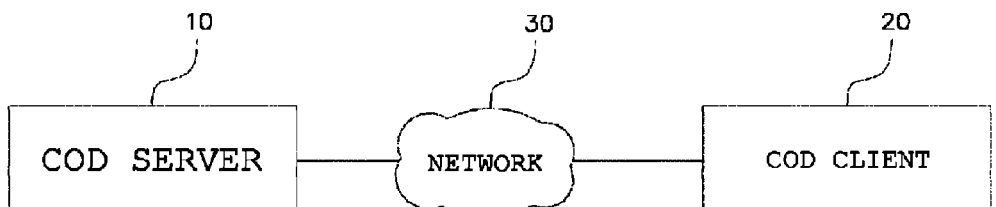
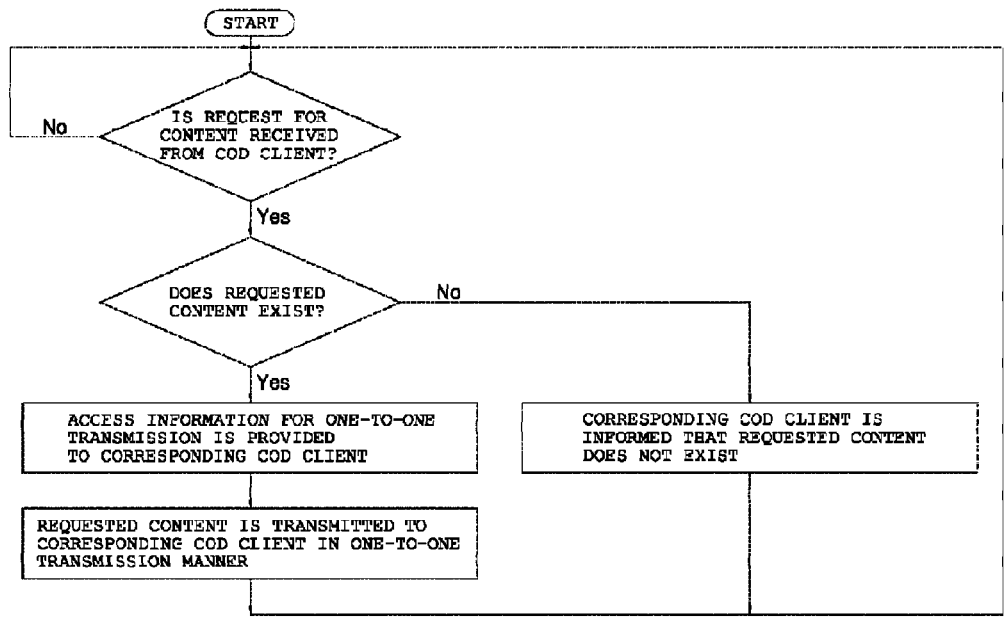
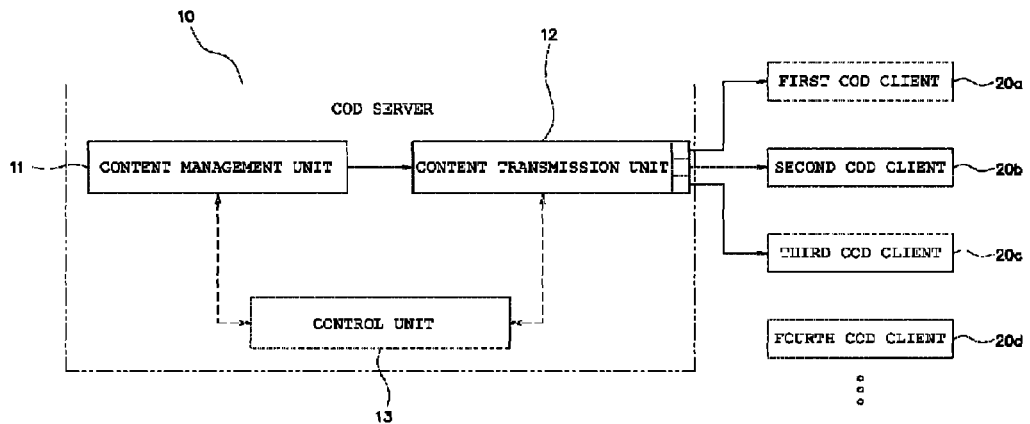

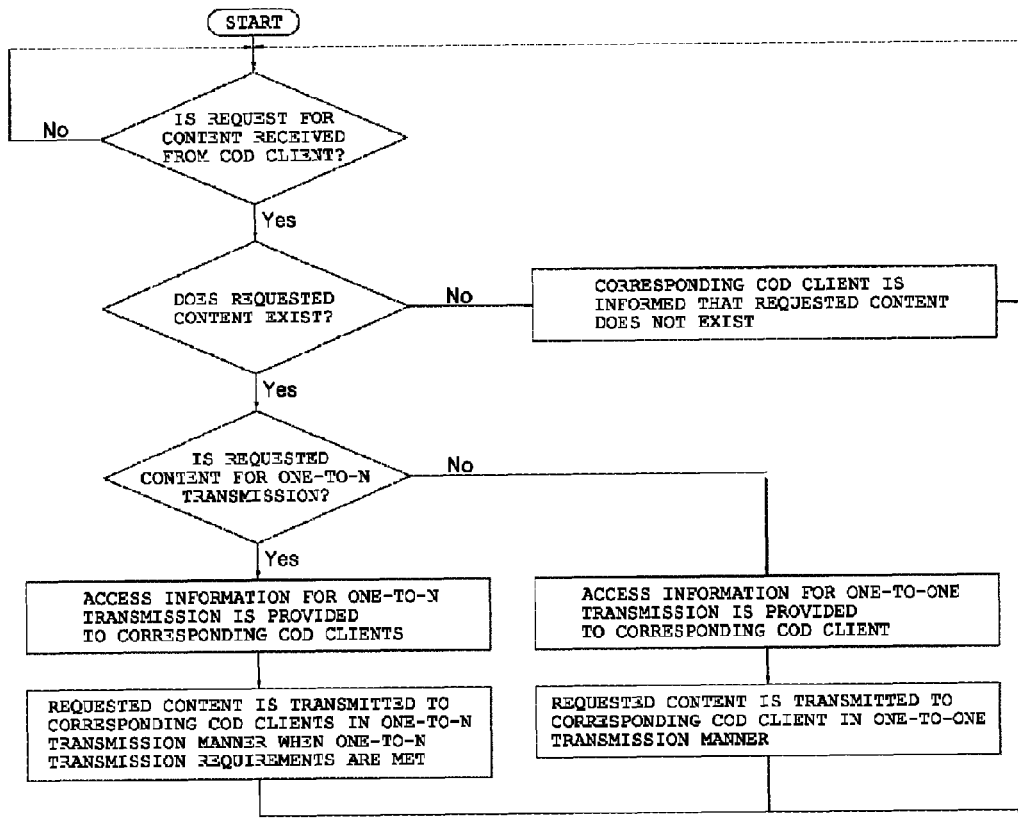
[Fig. 4]
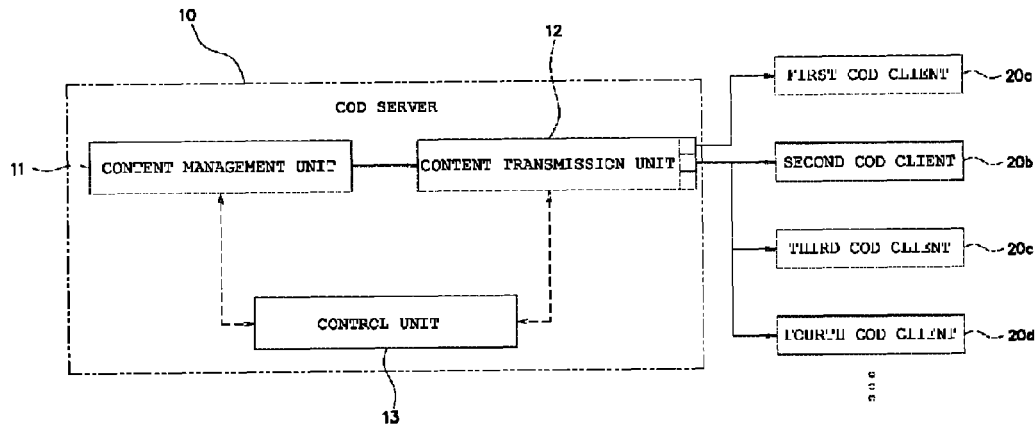
[Fig. 5]

OPERATING METHOD OF CONTENTS ON DEMAND SYSTEM

This application claims priority, under 35 U.S.C. §119, to International Patent Application No.:PCT/KR2007/005832, filed on Nov. 20, 2007, which claims priority to Korean patent application No.:KR 10-2006-0114233, filed Nov. 20, 2006, the disclosures of which are incorporated by reference herein in its entirety.

TECHNICAL FIELD

The present invention relates, in general, to a method of operating a Content-On-Demand (COD) system and, more particularly, to a method of operating a Content-On-Demand system which effectively provides content, thereby stably providing a COD service without expanding the capacity of a COD server or extending the bandwidth of a network.

BACKGROUND ART

As well known, Content On Demand is a bidirectional service which enables service subscribers to request and receive desired content (video, music, file, image, and website information) from a service provider at desired times, and Video On Demand (VOD), the provision of which is currently increasing, may be referred to as a representative of COD.

For reference, VOD systems generally provide all the functions of general video devices, other than the fact that video information is ordered over a network, that is, functions of playing, stopping, pausing, fast forwarding, fast rewinding, and starting to play at an arbitrary portions. According to the type of provision, services provided by such VOD systems are classified into a Real COD (RCOD) service, in which a predetermined charge is paid for each program, a Subscription COD (SCOD) service, in which a fixed charge is paid for one month while program packages are viewed without limitation as to the number of views, and a Free-On-Demand (FOD) service, which is supplied as marketing means for free.

A COD system, as shown in FIG. 1, includes a COD server 10, a COD client 20, and a network 30 for connecting them to each other.

The COD server 10 includes a high-capacity content database, and performs functions of searching for content requested by the COD client 20 and transmitting the corresponding content to the COD client 20.

The COD client 20 restores and plays the content transmitted from the COD server 10, and transmits the request of a user to the COD server 10.

The network 30 is means for connecting the COD server 10 and the COD client 20 such that communication therebetween is possible, and may include a well-known broadcasting network or information network.

Referring to FIG. 2, a method of operating a prior art Content-On-Demand system will be described stepwise below.

1. The step of receiving a request for content from a COD client 20.
2. The step of determining whether the requested content exists in the COD server 10, and, if the requested content does not exist, informing the corresponding COD client 20 that the requested content does not exist.
3. The step of determining whether the requested content exists in the COD server 10, and, if the requested content exists, providing access information for one-to-one transmission (unicast) to the corresponding COD client 20, so that a session is set up between the COD server 10 and the corresponding COD client 20, transmitting the requested content from the COD server 10 to the corresponding COD client 20 in a one-to-one transmission manner, and, when the transmission is completed, terminating the session between the COD server 10 and the corresponding COD client 20.

Referring to FIG. 3, the method of operating a Content-On-Demand system according to the related art will be described in further detail below.

With reference to the drawing, the COD server 10 is configured to include a content management unit 11 configured to have a content database and provide content to a content transmission unit 12; the content transmission unit 12 configured to transmit content, provided from the content management unit 11, to one or more COD clients 20a, 20b, 20c, and 20d over a network 30; and a control unit 13 configured to set up/terminate sessions between the COD server 10 and the respective COD clients 20a, 20b, 20c, and 20d, and control the operation of the content management unit 11 and the content transmission unit 12.

First, when a content request signal, provided from a first COD client 20a, is input to the COD server 10 over the network 30, the control unit 13 determines whether the requested content exists in the content database of the content management unit 11. If the requested content is found not to exist, the control unit 13 transmits a message informing the first COD client 20a that the requested content does not exist. If the requested content is found to exist, the control unit 13 transmits access information for one-to-one transmission, which allows access to the transmission-capable region of the content transmission unit 12, to the first COD client 20a, so that a session is set up between the COD server 10 and the first COD client 20a.

If the session is set up between the COD server 10 and the first COD client 20a, the control unit 13 controls the operation of the content management unit 11 and content transmission unit 12 and transmits the requested content to the first COD client 20a using the one-to-one transmission-capable region of the content transmission unit 12, for which the session has been set up.

When the transmission of the requested content from the COD server 10 to the first COD client 20a is completed, the control unit 13 terminates the session between the COD server 10 and the corresponding COD client 20 and completes a task for providing the content to the first COD client 20a.

Thereafter, if content is sequentially requested by a second COD client 20b and a third COD client 20c, the content is provided to the corresponding COD clients 20b and 20c through the above-described task in a one-to-one transmission manner.

However, when content is requested by one or more COD clients 20 (20a, 20b, 20c, and 20d), the prior art system uses a method of setting up sessions between the COD server 10 and the respective COD clients 20 (20a, 20b, 20c, and 20d) such that one-to-one transmission is possible between the COD server 10 and the respective COD clients 20 (20a, 20b, 20c, and 20d) regardless of the type of content requested by the respective COD clients 20 (20a, 20b, 20c, and 20d). Therefore, even though the COD clients 20a, 20b, 20c, and 20d, which are different from each other, request the same content, the regions of the content transmission unit 12 are separately allocated to the respective COD clients 20a, 20b, 20c, and 20d. Accordingly, if specific content (for example, a popular video or the latest video) is overwhelmingly requested for a short time, the capacity of the COD server 10 is exceeded, so that a problem occurs in that a server goes down.

In order to solve the above-described problem, in the prior art, the number of separate servers dedicated to the provision of popular content which is overwhelmingly requested for a short time must be increased, or the capacity of the region of the COD server 10 must be expanded and the bandwidth of a network must be extended so as to prepare the temporal access congestion. However, in these cases, a problem occurs in that investment must be continuously made in order to construct a stable COD system in response to the increase in the number of COD service users.

DISCLOSURE OF INVENTION

Technical Problem

Accordingly, the present invention has been made keeping in mind the above problems occurring in the prior art, and an object of the present invention is to provide a method of effectively operating a COD system capable of stably providing a COD service without expanding the capacity of a COD server or extending the bandwidth of a network.

Technical Solution

In order to accomplish the above object, the present invention provides a method of effectively operating a Content-On-Demand (COD) system, including a first step of receiving requests for content from one or more COD clients; a second step of, if the requested content exists in a COD server, determining whether the requested content is content for one-to-one transmission or content for one-to-N transmission; a third step of, if the content requested from the COD server is content for one-to-one transmission, setting up a session between the COD server and one of the COD clients by providing access information for one-to-one transmission from the COD server to the corresponding COD client, transmitting the requested content to the corresponding COD client from the COD server in a one-to-one transmission manner, and then terminating the session between the COD server and the corresponding COD client when the transmission is completed; and a fourth step of, if the content requested from the COD server is content for one-to-N transmission, setting up sessions between the COD server and the respective COD clients by providing access information for one-to-N transmission from the COD server to the corresponding COD clients, transmitting the requested content to the corresponding COD clients from the COD server in a one-to-N transmission manner when a one-to-N transmission requirement is met, and then terminating the sessions between the COD server and the corresponding COD clients when the transmission is completed.

ADVANTAGEOUS EFFECTS

The present invention employs a method of determining whether content requested by one or more COD clients is content for one-to-one transmission or content for one-to-N transmission, transmitting the requested content from a COD server to one of the corresponding COD client in a one-to-one transmission manner in the case in which the requested content is content for one-to-one transmission, and transmitting the requested content from the COD server to corresponding COD clients in a one-to-N transmission manner in the case in which the requested content is content for one-to-N transmission, so that a COD system is effectively managed, with the result that COD services can be stably provided without expanding the capacity of a COD server or extending the bandwidth of a network.

BRIEF DESCRIPTION OF THE DRAWINGS

FIG. 1 is a view schematically showing a COD system;

FIG. 2 is a flowchart showing a method of operating a prior art COD system;

FIG. 3 is a view showing a method of providing the content of the prior art COD system;

FIG. 4 is a flowchart showing a method of operating a COD system according to the present invention; and FIG. 5 is a view showing a method of providing the content of the COD system according to the present invention.

Description of reference characters of principal elements
10: COD server 11: content management unit
12: content transmission unit 13: control unit
20,20a,20b,20c,20d: COD clients

BEST MODE FOR CARRYING OUT THE INVENTION

Hereinafter, the present invention will be described in detail with reference to the attached drawings.

Since FIGS. 4 and 5 are both views showing methods of operating COD systems according to the present invention, the same reference numerals are used to designate the same components throughout the different drawings, that is, FIG. 1, schematically showing the COD system, and FIGS. 2 and 3, showing the prior art, and a description thereof is omitted.

With reference to FIG. 4, a method of operating a COD system according to the present invention will be described stepwise below.

1. The first step of receiving requests for content from one or more COD clients 20 (20a, 20b, 20c, and 20d).

At this step, a COD server 10 receives requests for content from the COD clients 20 (20a, 20b, 20c, and 20d). Users can select specific content from a list of content provided from the COD server 10 using the respective COD clients 20 (20a, 20b, 20c, and 20d) or can search for desired content (content that they desire to receive) using search windows provided from the COD server 10. As needed, users can modify the content request method in various ways.

Meanwhile, in the case in which specific content is selected from the list of content provided from the COD server 10, all content requested by the COD clients 20 (20a, 20b, 20c, and 20d) is known to exist in the COD server 10, so that there is no need to determine whether the content requested by the COD clients 20 (20a, 20b, 20c, and 20d) exists in the COD server 10. However, in the case in which desired content is searched for using the search window provided from the COD server 10, content requested by one of the COD clients 20 (20a, 20b, 20c, and 20d) may not exist in the COD server 10. Therefore, it is preferable to determine whether the content requested by the COD clients 20 (20a, 20b, 20c, and 20d) exists in the COD server 10, and, if any requested content does not exist in the COD server 10, inform the corresponding COD clients 20 (20a, 20b, 20c, and 20d) that the requested content does not exist, so that the users can be made aware the fact that the requested content does not exist.

2. The second step of, in the case in which the requested content exists in the COD server 10, determining whether the requested content is content for one-to-one transmission (unicast) or content for one-to-N transmission (multicast).

At this step, whether the requested content is content for one-to-one transmission or content for one-to-N transmission (multicast) is determined, and the determination method may be modified and performed in various manners, as needed. For example, in the state in which content stored in the COD server 10 has been manually classified into content for one-to-one transmission and content for one-to-N transmission by the manager of the COD server before this step is performed, the content requested by the COD clients 20 (20a, 20b, 20c, and 20d) can be simply determined as content for one-to-one transmission or content for one-to-N transmission at this step. Further, in the state in which content stored in the COD server 10 has been automatically classified into content for one-to-one transmission and content for one-to-N transmission based on a predetermined requirement by a program for classifying content into content for one-to-one transmission and content for one-to-N transmission before this step is performed, the content requested by the respective COD clients 20 (20a, 20b, 20c, and 20d) can be simply determined as content for one-to-one transmission or content for one-to-N transmission at this step. Further, as needed, in the state in which content stored in the COD server 10 has not been classified into content for one-to-one transmission and content for one-to-N transmission in advance before this step is performed, the content requested by the respective COD clients 20 (20a, 20b, 20c, and 20d) may be classified as content for one-to-one transmission or content for one-to-N transmission using the program for classifying content into content for one-to-one transmission and content for one-to-N transmission based on a predetermined requirement at this step, so that the content requested by the respective COD clients 20 (20a, 20b, 20c, and 20d) can be determined as content for one-to-one transmission or content for one-to-N transmission in real time.

Meanwhile, a requirement used to classify content stored in the COD server 10 into content for one-to-one transmission and content for one-to-N transmission may be modified in various ways, as needed.

For example, a reference date is determined in consideration of the date on which the content is provided, and content stored in the COD server 10 is classified into new content and old content based on the reference date, so that the new content, which is expected to be requested by a large number of requesters, may be classified as content for one-to-N transmission, and old content, which is expected to be requested by a small number of requesters, may be classified as content for one-to-one transmission. Further, a reference data value is determined in consideration of the size of the data of content, and content stored in the COD server 10 is classified into high-capacity content and low-capacity content based on the reference data value, so that the high-capacity content, for which the transmission time is expected to be long, may be classified as content for one-to-N transmission, and the low-capacity content, for which the transmission time is expected to be short, may be classified as content for one-to-one transmission. Further, a reference bandwidth value is determined in consideration of the value of the total bandwidth of the COD server 10, content requested by the respective COD clients 20 (20a, 20b, 20c, and 20d) is classified as content for one-to-one transmission or content for one-to-N transmission in real time using the reference bandwidth value, and the value of currently available bandwidth is compared with the reference bandwidth value. If the value of currently available bandwidth is equal to or greater than the reference bandwidth value, that is, in the state in which excess capacity of the COD server 10 is expected, content requested by the respective COD clients 20 (20a, 20b, 20c, and 20d) may be classified as content for one-to-N transmission. If the value of currently available bandwidth is less than the reference bandwidth value, that is, in the state in which no excess capacity of the COD server 10 is expected, content requested by the respective COD clients 20 (20a, 20b, 20c, and 20d) may be classified as content for one-to-one transmission. Further, as needed, the COD server 10 counts the number of content requesters during a predetermined time. If the number of requesters for the corresponding content is equal to or greater than the preset reference number of requesters, that is, the number of real-time content requesters is greater than the preset reference number of requesters, the corresponding content may be classified as content for one-to-N transmission. If the number of requesters for the corresponding content is less than the preset reference number of requesters, that is, the number of real-time content requesters is less than the preset reference number of requesters, the corresponding content may be classified as content for one-to-one transmission.

3. The third step of, in the case in which the content requested from the COD server 10 is content for one-to-one transmission, setting up a session between the COD server 10 and one of the corresponding COD clients 20 (20a, 20b, 20c, and 20d) by providing access information for one-to-one transmission from the COD server 10 to the corresponding COD client 20 (20a, 20b, 20c, or 20d), transmitting the requested content to the corresponding COD client 20 (20a, 20b, 20c, or 20d) from the COD server 10 in a one-to-one transmission manner, and then terminating the session between the COD server 10 and the corresponding COD client 20 (20a, 20b, 20c, or 20d) when the transmission is completed.

4. The fourth step of, in the case in which the content requested from the COD server 10 is content for one-to-N transmission, setting up sessions between the COD server 10 and the respective corresponding COD clients 20 (20a, 20b, 20c, and 20d) by providing access information for one-to-N transmission from the COD server 10 to the corresponding COD clients 20 (20a, 20b, 20c, and 20d), transmitting the requested content from the COD server 10 to the respective corresponding COD clients 20 (20a, 20b, 20c, and 20d) in a one-to-N transmission manner when a one-to-N transmission requirement is met, and then terminating the sessions between the COD server 10 and the corresponding COD clients 20 (20a, 20b, 20c, and 20d) when the transmission is completed.

At this fourth step, the access information for one-to-N transmission may vary depending on the communication manner, that is, the type of network 30. If the network 30 is a well-known broadcasting network, the access information may include information about a frequency, Transport Stream (TS) IDentification (ID), Packet IDentification (PID, in the case of a single type of packet, such as video or audio), and a program number (in the case in which audio, video, and captions form a single piece of content). Further, if the network 30 is a well-known information network, the access information may include information about a Uniform Resource Locator (URL) and an Internet Protocol (IP) multicast address.

At this fourth step, the operator or manager of the COD system can freely set the one-to-N transmission requirement, as needed. For example, a time taken for the connection of a session between the COD server 10 and the COD client 20 (20a, 20b, 20c, or 20d) that first requested the corresponding content is counted, and the counted time taken for the connection of the session is compared with a preset reference time. If the time taken for the connection of the session is equal to or greater than the reference time, it can be determined that the one-to-N transmission requirement is met.

Here, the operator or manager of the COD system can freely modify the preset reference time, as needed.

Further, the number of COD clients 20 (20a, 20b, 20c, and 20d) that request the corresponding content is counted, and the accumulated value of the counted number of COD clients 20 (20a, 20b, 20c, and 20d) is compared with a preset reference value. If the accumulated value is equal to or greater than the reference value, it can be de termined that the one-to-N transmission requirement is met. Here, the operator or manager of the COD system can also freely modify the preset reference value, as needed. Further, as needed, all of the above-described one-to-N transmission requirements can be applied. That is, if the time taken for the connection of a session is equal to or greater than the reference time, it is determined that the one-to-N transmission requirement is met. Further, if the accumulated value of the counted number of COD clients 20 (20a, 20b, 20c, and 20d) is equal to or greater than the reference value, it is determined that the one-to-N transmission requirement is met even though the time taken for the connection of a session is less than the reference time. Furthermore, if the accumulated value of the counted number of COD clients 20 (20a, 20b, 20c, and 20d) is equal to or greater than the reference value, it is determined that the one-to-N transmission requirement is met. Further, if the time taken for the connection of a session is equal to or greater than the reference time, it is regarded that the one-to-N transmission requirement is met even though the accumulated value is less than the reference value.

FIG. 5 shows the state in which content is transmitted from the COD server 10 to the respective COD clients 20a, 20b, 20c, and 20d using the method of operating a COD system according to the present invention.

In the case in which the content requested by the first COD client 20a is content for one-to-one transmission, the transmission of content from the COD server 10 to the first COD client 20a is performed through the one-to-one transmission region of the content transmission unit 12, for which a session is set up, in a one-to-one manner.

Meanwhile, in the case in which content requested by second to fourth COD clients 20b, 20c, and 20d is a single piece of content for one-to-N transmission, the transmission of the content from the COD server 10 to the respective second to fourth COD clients 20b, 20c, and 20d is performed through the one-to-N transmission region of the content transmission unit 12, for which sessions are set up, in a one-to-N manner.

Therefore, COD services can be stably provided without expanding the capacity of the COD server or extending the bandwidth of the network.

The present invention is not limited to the above-described embodiments, and various modifications are possible without departing from the scope of the invention as disclosed in the accompanying claims.

The invention claimed is:

1. A method of effectively operating a Content-On-Demand (COD) system, comprising:
   a first step of receiving requests for content from one or more COD clients;
   a second step of, if the requested content exists in a COD server, determining whether the requested content is content for one-to-one transmission or content for one-to-N transmission;
   a third step of, if the content requested from the COD server is content for one-to-one transmission, setting up a session between the COD server and one of the COD clients by providing access information for one-to-one transmission from the COD server to the corresponding COD client, transmitting the requested content to the corresponding COD client from the COD server in a one-to-one transmission manner, and then terminating the session between the COD server and the corresponding COD client when the transmission is completed;
   and a fourth step of, if the content requested from the COD server is content for one-to-N transmission, setting up sessions between the COD server and the respective COD clients by providing access information for one-to-N transmission from the COD server to the corresponding COD clients, transmitting the requested content to the corresponding COD clients from the COD server in a one-to-N transmission manner when a one-to-N transmission requirement is met, and then terminating the sessions between the COD server made the corresponding COD clients when the transmission is completed,
   wherein the one-to-N transmission requirement at the fourth step is determined to be met by counting a time taken for connection of a session between the COD server and a COD client that first requested the corresponding content, and comparing the counted time taken for connection of the session with a preset reference time, and determining that one-to-N transmission requirement is met if the time taken for the connection of the session is equal to or greater than the reference time;
   wherein the one-to-N transmission requirement is determined to be met if the time taken for the connection of the session is equal to or greater than the reference time; and the one-to-N transmission requirement is determined to be met by counting a number of COD clients that request the corresponding content, comparing an accumulated value of the counted number of the COD clients with a preset reference value, and, if the accumulated value is equal to or greater than the reference value, determining that the one-to-N transmission requirement is met, even though the time taken for the connection of the session is less than the reference time.

2. The method according to claim 1, wherein the content stored in the COD server is classified based on dates on which service for the content is provided into content for one-to-N transmission, that is, new content which is expected to be requested by a large number of requesters, and content for one-to-one transmission, that is, old content which is expected to be requested by a small number of requesters.

3. The method according to claim 1, wherein the content stored in the COD server is classified based on sizes of data of content into content for one-to-N transmission, that is, high-capacity content for which a transmission time is expected to be long, and content for one-to-one transmission, that is, low-capacity content for which a transmission time is expected to be short.

4. The method according to claim 1, wherein a reference bandwidth value is determined in consideration of a value of total bandwidth of the COD server; a value of currently available bandwidth is compared with the reference bandwidth value; and the content requested by the COD clients is classified as content for one-to-N transmission if the value of currently available bandwidth is equal to or greater than the reference bandwidth value, and the content requested by the COD clients is classified as content for one-to-one transmission if the value of currently available bandwidth is less than the reference bandwidth value.

5. The method according to claim 1, wherein the COD server counts a number of content requesters during a predetermined time; and classifies the corresponding content, if a number of requesters for the corresponding content is equal to or greater than a preset reference number of requesters, as content for one-to-N transmission, and classifies the corresponding content, if the number of requesters for the corresponding content is less than the preset reference number of requesters, as content for one-to-one transmission.

6. The method according to claim 1, wherein the access information at the fourth step includes information about a frequency, Transport Stream (TS) IDen-tification (ID), Packet IDentification (PID), and a program number; and a network for connecting the COD server and the COD clients is a broadcasting network.

7. The method according to claim 1, wherein the access information at the fourth step includes information about a Uniform Resource Locator (URL) and an Internet Protocol (IP) multicast address; and a network for connecting the COD server and the COD clients is an information network.

8. The method according to claim 1, wherein, if the content requested by one or more COD clients is not found to exist in the COD server, the first step comprises informing the corresponding COD clients that the requested content does not exist.

* * * * *